US008563955B2

(12) United States Patent
Dekorsy et al.

(10) Patent No.: US 8,563,955 B2
(45) Date of Patent: Oct. 22, 2013

(54) PASSIVE TERAHERTZ RADIATION SOURCE

(75) Inventors: Thomas Dekorsy, Konstanz (DE); Gregor Klatt, Konstanz (DE); Georg Bastian, Kieve (DE); Klaus Huska, Pfinztal (DE)

(73) Assignee: Baden-Wurttemberg Stiftung GGmbH, Stuttgart (DE)

( * ) Notice: Subject to any disclaimer, the term of this patent is extended or adjusted under 35 U.S.C. 154(b) by 0 days.

(21) Appl. No.: 13/377,485

(22) PCT Filed: Jun. 9, 2009

(86) PCT No.: PCT/EP2009/004258
§ 371 (c)(1),
(2), (4) Date: Feb. 16, 2012

(87) PCT Pub. No.: WO2010/142313
PCT Pub. Date: Dec. 16, 2010

(65) Prior Publication Data
US 2012/0132832 A1   May 31, 2012

(51) Int. Cl.
*G02F 2/02* (2006.01)

(52) U.S. Cl.
USPC .............. 250/494.1; 250/338.1; 250/493.1; 250/503.1

(58) Field of Classification Search
USPC .......... 250/493.1, 494.1, 495.1, 503.1, 338.1
See application file for complete search history.

(56) References Cited

U.S. PATENT DOCUMENTS

| 7,619,263 | B2 * | 11/2009 | Shur et al. ............... 257/198 |
| 7,919,764 | B2 * | 4/2011 | Metcalfe et al. .......... 250/504 R |
| 8,269,200 | B2 * | 9/2012 | Wraback et al. .......... 250/504 R |

| 2005/0121629 | A1 * | 6/2005 | Unterrainer et al. ...... 250/504 R |
| 2007/0034813 | A1 * | 2/2007 | Shen et al. .................. 250/493.1 |
| 2009/0225311 | A1 * | 9/2009 | Umetsu ......................... 356/317 |

FOREIGN PATENT DOCUMENTS

| EP | 1 855 156 A1 | 11/2007 |
| WO | WO 2006/047975 A1 | 5/2006 |
| WO | WO 2007/112925 A1 | 10/2007 |

OTHER PUBLICATIONS

International Search Report and Written Opinion dated Jun. 7, 2010 issued in PCT Application No. PCT/EP2009/004258, 15 pages.
Chau et al., "Two-dimensional drift-diffusion analysis of magnetic field enhanced THz emission from semiconductor surfaces," Optics Communications, vol. 242, No. 1-3, Nov. 26, 2004, pp. 295-304, XP004638713.

(Continued)

*Primary Examiner* — Michael Logie
(74) *Attorney, Agent, or Firm* — Harrity & Harrity, LLP

(57) ABSTRACT

The invention concerns a passive terahertz radiation source configured to emit electromagnetic radiation having frequency in the range of 10 GHz to 50 THz and a method for generating a terahertz radiation. The passive terahertz radiation source comprises: a source of a pulsed excitation light; an emitter comprising one or more emitter elements, each emitter element comprising a semiconductor layer being arranged such that at least a portion of a first major surface of said semiconductor layer is exposed to the excitation light, wherein each emitter element is configured such that upon exposure to the excitation light, a gradient of the charge carrier density is generated in the semiconductor layer in the area of transition between a first area of the semiconductor layer and a second area of the semiconductor layer, the gradient being substantially parallel to the first major surface of the semiconductor layer.

15 Claims, 6 Drawing Sheets

(56) References Cited

OTHER PUBLICATIONS

Dekorsy et al., "THz-wave emission by coherent optical phonons," Physica B, vol. 219-220, Apr. 1, 1996, pp. 775-777, XP026947855.
Wilke, "Terahertz emission from narrow band gap semiconductors," Rensselaer Polytechnic Institute, Department of Physics, Applied Physics & Astronomy, vol. 6772, No. 1, Sep. 26, 2007, 9 total pages, XP002581263.
Dekorsy et al., "THz electromagnetic emission by coherent infrared-action phonons," Physical Review B, vol. 53, No. 7, Feb. 15, 1996, pp. 4005-4014, XP002581264.
Dreyhaupt et al., "High-intensity terahertz radiation from a microstructured large-area photoconductor," Applied Physics Letters, vol. 86, 12114 (2005), 3 total pages.
Tonouchi, "Cutting-edge terahertz technology," Institute of Laser Engineering, Osaka University, published in Nature photonics, vol. 1, Feb. 2007, pp. 97-105.

\* cited by examiner

PASSIVE TERAHERTZ RADIATION SOURCE

The invention relates to a passive terahertz radiation source and a method for generating terahertz radiation, in particular to a passive terahertz radiation source for generation of broadband electromagnetic radiation in the frequency range of 10 GHz to 50 THz, in particular in the frequency range of 100 GHz to 10 THz.

There are various known terahertz radiation sources. The article "Cutting-edge terahertz technology" by Masayoshi Tonouchi, published in Nature photonics, Vol. 1, February 2007, pp. 97-105 gives an overview of conventional terahertz radiation sources and their applications.

Large-area terahertz emitters are one type of terahertz radiation source, which produce pulsed terahertz radiation. These sources emit broadband terahertz radiation with high field strength after an excitation with ultrashort laser pulses (i.e. pulses having a duration on the order of several femtoseconds (fs) to picoseconds). The photo-generated, or respectively photo-induced charge carriers (electrons and holes), are accelerated in an external electric field parallel to the surface of the semiconductor, emitting thereby terahertz radiation in a direction substantially normal to the surface of the semiconductor. The terahertz radiation sources of the above type comprise an external voltage source and electrodes for the application of the external voltage. The applied voltages are typically in the range of 10 to 20 V, and the electrode spacing being typically about 5 µm. The electric field strength is thus typically in the range of 20 to 40 kV/cm. Terahertz radiation sources of the above type are disclosed for example in the international patent applications WO 2006/047975 A1 and WO 2007/112925 A1 and the article "High-intensity terahertz radiation from a microstructures large-area photoconductor" by Dreyhaupt at al. published in Applied Physics Letters, Vol. 86, 121114 (2005).

One disadvantage of the conventional large-area terahertz emitters of the above described type is the necessity of employing an external voltage source. When a voltage is applied, there flows—depending on the quality of the source—a dark current, and upon light incidence a photocurrent, which is proportional to the light intensity. The electrical power—which may be determined from the applied voltage and the photocurrent—is substantially fully transformed in heat, which should be removed. This factor limits the terahertz emitter is several ways: i) the maximal optical power which is dissipated in the emitter and ii) the maximum voltage which can be applied to the emitter in order not to produce too high photocurrents or electrical breakdown of the emitter. This voltage is typically one order of magnitude below the breakdown field strength of the employed semiconductor.

A further disadvantage is the saturation of the emitted terahertz power at high excitation densities caused by the screening of the externally applied electric field by the electric field of the generated electron-hole pairs.

A different approach for generating terahertz radiation is disclosed in the article of Dekorsy et al., "THz electromagnetic emission by coherent infrared-active phonons", Phys. Rev. B, 53, 4005 (1996). This article describes the emission of a terahertz radiation via excitation of a semiconductor (in the specific case tellurium) with an ultrashort laser impulse based on the photo-Dember effect. Similar effects have been observed in various other semiconductors.

The generation of terahertz radiation based on the photo-Dember effect does not utilize the acceleration of electrons and holes in an external electrical field, but rather the spatial separation of the electrons and holes due to diffusion. The differences in the mobilities of the electrons and holes, combined with the anisotropy in the distribution of the photo-generated (respectively photo- or optically-induced) electrons, leads to an effective charge separation in a direction perpendicular to the surface of the semiconductor. Due to the time-scale of the charge separation in the sub-picoseconds to picoseconds range, electromagnetic radiation in the terahertz range is generated.

More specifically, the mobilities of the electrons and the holes in semiconductors are generally intrinsically different. Furthermore, the finite absorption length and the presence of a semiconductor surface lead to an intrinsic anisotropy in the distribution of the electrons and holes in a direction normal (i.e. orthogonal) to the semiconductor surface. This leads to the emission of terahertz radiation. The intensity of the emitted terahertz radiation is proportional to the $\sin^2\theta$, wherein $\theta$ denotes the angle between the accelerated charge carriers and the direction of observation. In case the excitation light is incident in the direction orthogonal to the semiconductor surface (i.e. in normal direction), the emitted or in other words generated terahertz radiation is not emitted in a direction parallel to the excitation light. One disadvantage of the terahertz radiation sources of the above type may be the poor outcoupling efficiency of the generated terahertz radiation, with the main intensity being emitted parallel to the surface.

It is therefore desirable to provide a terahertz radiation source and a method for generation of terahertz radiation, which overcome at least in part the problems of conventional terahertz sources. In particular, it is an object to provide a terahertz source with improved efficiency, which has a simple structure and is therefore easy to use and manufacture. A further object may be to increase the intensity of the generated terahertz radiation. Furthermore, it may be advantageous to reduce the amount of generated heat and to alleviate or avoid altogether the saturation effects at high excitation intensities.

According to an aspect of the invention, there is provided a passive terahertz radiation source having the features disclosed in claim 1 and a method for generation of a terahertz radiation having the features disclosed in claim 15. Preferred embodiments are the subject of the dependent claims.

In particular, according to an aspect of the invention there is provided a passive terahertz radiation source configured to emit electromagnetic radiation having a frequency in the range of 10 GHz to 50 THz, optionally in the range of 100 GHz to 10 THz, comprising:

a source of a pulsed excitation light;

an emitter comprising one or more emitter elements, each emitter element comprising a semiconductor layer being arranged such that at least a portion of a first major surface of said semiconductor layer is exposed to the excitation light, wherein each emitter element is configured such that upon exposure to the excitation light, a gradient, in particular a strong or sharp gradient of the charge carrier density is generated in the semiconductor layer in the area of transition between a first area of the semiconductor layer and a second area of the semiconductor layer, the gradient being substantially parallel to the first major surface of the semiconductor layer.

The term passive terahertz radiation source, within the scope of the present patent application, may be understood as a terahertz radiation source capable of generating, or configured to generate, terahertz radiation without the employment of an external voltage source, i.e. without the application of an external voltage. Thus, for example, the passive terahertz radiation source does not comprise electrodes for applying an external voltage across the semiconductor layer, in order to generate terahertz radiation.

Rather, the terahertz radiation source utilizes a different principle in order to generate terahertz radiation. Namely, the anisotropy in the distribution of the photo-generated charge carriers in a direction parallel to a first major surface of the semiconductor layer, at least a portion of which is exposed to an excitation light. The first major surface of the semiconductor layer will also be referred to as an incident surface of the semiconductor layer. The anisotropy in the distribution of the photo-generated charge carriers in a direction parallel to the incident semiconductor surface is expressed in particular in the generation of one or more gradients, in particular one or more strong or sharp gradients of the density of the charge carriers in a direction substantially parallel to the incident semiconductor surface. Generally, the term gradient refers to the change in the value of a quantity per unit distance in a specified direction. The strongest or sharpest gradient is achieved with a step-like increase or decrease in a quantity as mathematically described by a Heavyside step-function. Such a step in a charge carrier distribution leads to the highest diffusion currents. Within the scope of the present patent application, the term strong or sharp "gradient" may be understood to refer to the sharp or abrupt change in the density of the (photo-generated) charge carriers in a given direction. In particular, a (strong or sharp) gradient refers to a substantially step-like change in the density of the charge carriers, or in other words, a substantially step-like distribution of the charge carriers in a given direction.

The anisotropy in the distribution of the photo-generated (or photo-excited or photo-induced) charge carriers leads to a spatial separation of the photo-generated charge carriers via diffusion in a direction parallel to the incident semiconductor surface, due to the intrinsically different mobilities of the different types of charge carriers (i.e. due to the different mobilities of the electrons and holes). The spatial separation of the charge carriers (electrons and holes) leads in turn to an emission of a (pulsed) terahertz radiation in a direction substantially normal to the incident semiconductor surface by the photo-Dember effect.

Thus, unlike conventional terahertz radiation sources based on the photo-Dember effect, the passive terahertz radiation source utilizes the anisotropy of the distribution of the photo-generated charge carriers in the semiconductor layer in a direction substantially parallel to the incident semiconductor surface (i.e. substantially in the plane of the semiconductor layer), rather than the anisotropy of the distribution of the photo-generated charge carriers in a direction normal to the incident semiconductor surface (i.e. substantially normal to the plane of the semiconductor layer). In other words, the passive terahertz radiation source is configured so as to generate one or more gradients, in particular one or more strong or sharp gradients of the charge carrier density in the semiconductor layer in a direction substantially parallel to the incident surface of the semiconductor layer, rather than being configured to generate a gradient of the charge carrier density in a direction substantially normal to the incident surface of the semiconductor layer.

The anisotropy in the distribution of the charge carriers in a direction parallel to the incident surface of the semiconductor layer, which is expressed in one or more gradients of charge carrier density in the semiconductor layer in a direction substantially parallel to the incident semiconductor surface, may be realized for example by a suitable structuring of the emitter element, in particular by a suitable structuring of the semiconductor layer and/or by an application of an (suitably structured) additional masking layer.

The pulse duration of the pulsed excitation light is typically in the femtosecond to picosecond range, in particular several femtoseconds or few tens of femtoseconds. The wavelength of the pulsed excitation light is chosen to excite electron-hole pairs in the semiconductor, which may be in the infrared range, in particular in the near infrared range.

The average duration of the generated terahertz pulses may be from about a femtosecond (fs) to about hundred (or several hundreds of) picoseconds (ps), in particular from about a few tens of femtoseconds to a few picoseconds. The average repetition range may be given by the repetition range of the laser used for excitation of the emitter. The average power level of the generated terahertz radiation may lie in the picowatt (pW) to milliwatt (mW) range, depending on the size of the emitter and the average excitation power.

According to an aspect, each emitter element of the passive terahertz radiation source may be configured such that:
  the number of (photo-generated) charge carriers in the first area and the number of charge carriers in the second area of the semiconductor layer differ substantially, generating thereby the gradient, in particular the strong or sharp gradient of the charge carrier density in the semiconductor layer in a direction parallel to the first major surface of the semiconductor layer; and/or
  the mobility of the charge carriers in the first area and the mobility of the charge carriers in the second area of the semiconductor layer differ substantially, generating thereby the gradient, in particular the strong or sharp gradient of the charge carrier density in the semiconductor layer in a direction parallel to the first major surface of the semiconductor layer.

The (strong or sharp) gradient of the charge carrier density in a direction parallel to the first major surface of the semiconductor layer (i.e. to the incident surface of the semiconductor layer of each emitter element) may be generated either due to the difference in the number of photo-generated charge carriers in different areas of the semiconductor layer or due to the difference in the mobilities of the charge carriers in different areas of the semiconductor layer. A suitable combination of both techniques is also possible.

In one example, anisotropic excitation of the charge carriers across the semiconductor layer may be utilized in order to generate one or more (strong or sharp) gradients of the charge carrier density in the semiconductor layer in a direction substantially parallel to the incident semiconductor surface (in the plane of the semiconductor layer).

For example each emitter element may be configured such that the number of photo-excited (photo-generated) charge carriers in the semiconductor layer is varied, respectively spatially modulated across the semiconductor layer. In particular, each emitter element may comprise at least a first area and a second area adjacent to the first area, wherein the number of photo-excited charge carriers in a first area of the semiconductor layer corresponding to the first area of the emitter and the number of photo-excited charge carriers in the second area of the semiconductor layer corresponding to the second area of the emitter differ substantially from each other. A (strong or sharp) gradient of charge carrier density in a direction parallel to the incident semiconductor surface is generated in the transition area from an area of the semiconductor layer, in which there is a relatively high number of photo-generated charge carriers to an adjacent area, in which there is a relatively low number of photo-generated charge carriers.

A spatial variation in the number of the photo-generated charge carriers across the semiconductor layer and/or across the emitter may be achieved for example by suitably modifying or structuring the semiconductor layer, so as to create one or more areas which do not substantially absorb the incident excitation light (i.e. one or more non-absorbent areas). Alternatively or in addition, an additional masking layer may be applied or deposited on the incident semiconductor surface, said masking layer being configured to vary or spatially modulate the amount of excitation light reaching the semiconductor layer across the incident surface of the semiconductor layer. The masking layer may be of or composed of a material with high absorption of the given excitation light, or from a material which exhibits a high reflectance of the given excitation light.

In another example, a local variation of the mobilities of the charge carriers across the semiconductor layer may be utilized in order to generate one or more gradients of the charge carrier density in a direction parallel to the incident semiconductor surface. For example, the semiconductor layer may be structured or modified so as to create one or more areas, in which the mobility of the photo-generated charge carriers is substantially smaller than in non-modified areas of the semiconductor layer. A gradient of charge carrier density in a direction parallel to the incident semiconductor surface is generated in the transition area from a non-modified to an adjacent modified area.

A suitable combination of the above described techniques may also be employed.

According to an aspect, the emitter may comprise a plurality of emitter elements, said plurality of emitter elements being configured such that a plurality of substantially unidirectional gradients of the charge carrier density are generated in a direction substantially parallel to the first major surface of the semiconductor layer.

The plurality of gradients of the charge carrier density may form a periodical pattern. When a plurality of (strong or sharp) gradients are generated, it is advantageous if they are unidirectional, i.e. in substantially same direction. Thus, the destructive superposition of the terahertz radiation generated due to gradients with opposite direction may be efficiently prevented.

The direction of the gradient of the charge carrier density may be for example defined as the direction pointing from the first area of the semiconductor layer, in which (initially, i.e. prior to the diffusion) charge carriers are photo-generated and/or in which the photo-generated charge carriers exhibit higher mobility, towards the second area of the semiconductor layer adjacent to the first area, which may be (initially) substantially free from photo-generated charge carriers and/or in which the photo-generated charge carriers exhibit low mobility. The first area may correspond to an area of the semiconductor layer not covered by a masking material, to an area of the semiconductor layer covered by a masking material having a small thickness, or to a non-modified area of a semiconductor layer. The second area may correspond to an area of the semiconductor layer at least partially covered by a masking material or to a modified area of a semiconductor layer.

The unidirectivity of the multiple gradients of the charge carrier density in the semiconductor layer, generated upon exposure to excitation light, may be achieved in various ways. For example the unidirectivity of the generated gradients may be achieved by a suitable structuring of the semiconductor layer and/or by a provision of an (suitably structured) additional masking layer, as it will be explained in more detail below.

According to an aspect, each emitter element may comprise a masking layer of a material capable of absorbing or reflecting the excitation light, said masking layer being applied on the first major surface of the semiconductor layer, such that the first area of the semiconductor layer is substantially free from the masking layer and at least a portion of the second area of the semiconductor layer is covered by the masking layer.

As explained above, a (sharp or strong) gradient of the charge carrier density distribution is generated in the area of transition from a first area of the semiconductor layer not covered by masking material to an adjacent second area of the semiconductor layer covered by the masking material.

The thickness of the masking layer covering at least a portion of the second area of the semiconductor layer, or the maximal thickness of the masking layer (if the thickness of the masking layer is not uniform) covering at least a portion of the second area of the semiconductor layer, is advantageously no less than the absorption length of the excitation light in the masking material. For example if the masking layer is made of gold, the thickness of the masking layer or the maximal thickness of the masking layer of each emitter element should be advantageously no less than about 15 nm.

If the emitter comprises a plurality of emitter elements, for example a plurality of emitter elements sharing a common semiconductor layer, the total area of the first major surface of the semiconductor layer covered by masking material (corresponding to the total area of the masking layers of each emitter elements) may be greater than 10 $\mu m^2$, optionally greater than 100 $\mu m^2$, further optionally greater than 1 $mm^2$, further optionally greater than 1 $cm^2$, still further optionally greater than 10 $cm^2$.

The emitting elements may be arranged in a periodic structure or pattern. The masking layers of each of the emitting elements thus also form a periodic structure or pattern (masking pattern). The period of the periodic masking pattern may be equal or less than 500 $\mu m$, optionally equal or less than 50 $\mu m$, further optionally equal or less than 5 $\mu m$.

The width of the first area of the semiconductor layer of each emitter element which is not covered by the masking layer may correspond (i.e. be substantially equal) to at least the wavelength of the excitation light. For the near infrared excitation light the minimal width of the first area may be about 1 $\mu m$. The width of the second area of the semiconductor layer of each emitter element which is covered by the masking layer (corresponding to the width of the masking layer of each emitter element) may correspond (i.e. be substantially equal) to at least the distance which the charge carriers may cover through diffusion for a duration of about several picoseconds (ps). For the GaAs as semiconductor material, the minimal width of the second area may be about 1 $\mu m$.

The masking layer may be of or composed of material which is opaque for near-infrared radiation, for example metal (e.g. gold, etc.). Alternatively, the masking layer may be of or composed of a dielectric material. The masking layers of each of the plurality of emitter elements may form a Bragg-mirror, which reflects the incident excitation light.

The thickness and/or the specific profile of the masking layer may vary, so as to facilitate the generation of terahertz radiation.

In an alternative example, the masking layer may be applied such at least a portion of the first area of the semiconductor layer and at least a portion of the second area of the semiconductor layer are covered by the masking layer. In particular, the masking layer may be a continuous layer applied on the first major surface of the semiconductor layer so as to cover substantially the whole first major surface (incident surface) of the semiconductor layer. In order to generate a (sharp or strong) gradient of the charge carrier density distribution in the area of transition from the first area of the semiconductor layer to the adjacent second area of the semiconductor layer, the thickness and/or the form or shape of the masking layer covering at least a portion of the first area and at least a portion of the second area of the semiconductor layer may be selected such that upon illumination with excitation light the number of charge carriers (electron-hole pairs) generated in the first area is substantially greater than the number of charge carriers generated in the second area. For example, the thickness of the masking layer may be spatially varied, such that the thickness of the masking layer covering the first area of the semiconductor layer is considerably smaller than the thickness of the masking layer covering the second area of the masking layer. In the area of transition from the first area to the second area of the semiconductor there may be a sharp or abrupt change of the thickness of the masking layer.

According to an aspect, the thickness of the masking layer of each of the emitter elements may be substantially uniform.

In an example, the emitter may comprise a plurality of emitter elements, wherein each of the emitter elements exhibits a uniform (and substantially the same) thickness and wherein the masking layer covering each of the emitter elements has a substantially uniform thickness. In one example the emitter may comprise a plurality of emitter elements which all share a common semiconductor layer. In this case the unidirectivity of the generated (sharp or strong) gradients may be realized by varying the form or shape of the masking layer covering a second area of each of the plurality of emitter elements. Alternatively, the unidirectivity of the generated gradients may be achieved by separating the plurality of masking elements from each other by means of grooves, cuts or channels formed in the semiconductor layer. In particular, the form of the masking layer of each of the emitter elements may be selected so as to exhibit a sharp, substantially straight edge on each of its sides. On the other or opposite side, the masking layer may exhibit a structured surface which successively covers ever smaller portions of the incident surface of the semiconductor layer.

In an example, the emitter may comprise a plurality of emitter elements, wherein an intersection of the masking layer of each of the plurality of emitter elements with a plane substantially parallel to the first major surface of the semiconductor layer has a substantially comb-like form, comprising one substantially straight edge on one of its sides and a plurality of substantially equidistantly spaced teeth on the opposite side. Each tooth may have substantially triangular form, (for example a triangle having at least two equal sides) with one of its sides being substantially parallel to the substantially straight edge.

Thus, the masking layer of each emitter element is a structured masking layer, having a comb-like form and optionally a substantially uniform thickness.

The width of the teeth of each of the comb-like masking elements as well as the distance between two teeth may be selected depending on the wavelength of the excitation light. It is advantageous if the spatial elongation or extension of the teeth of each of the comb-like masking layers is no greater than the wavelength of the excitation light. If the extension or elongation of the teeth of each of the comb-like masking elements is smaller than the wavelength of the excitation light, the profile of the optically generated distribution of the charge carriers no longer corresponds to the profile of the masking, due to the diffraction. By varying the width of the comb teeth and/or the distances between the comb teeth, it is possible to vary the charge carrier density in accordance with the ratio of the masked and non-masked (exposed) surface.

The comb-like form of the structured masking layer leads to an anisotropical distribution of the charge carrier density in the semiconductor layer in a direction parallel to the incident surface of the semiconductor layer. Furthermore, the comb-like form of the of the (structured) masking layer contributes to the prevention of the generation of a (strong or sharp) gradient in the area of transition between the masked and non-masked areas of two neighboring emitter elements. Thus, the comb-like form of the masking layer of each emitter element contributes to the prevention of destructive superposition of the generated terahertz radiation light.

According to another aspect, the thickness of the masking layer of each of the emitter elements may be variable and the thickness distribution may be asymmetric in a direction parallel to the first major surface of the semiconductor layer.

As already explained above, it is advantageous that in case a plurality of emitter elements are provided, the generated (strong or sharp) gradients of the charge carrier density in a direction parallel to the first major surface (incident surface) of the semiconductor layer are unidirectional. In one example, the emitter elements may all share the same semiconductor layer and their unidirectivity may be achieved by a suitable structuring of the masking layer. The unidirectivity of the generated gradients may be achieved by varying the thickness of the masking layers of each of the emitter elements so as to vary the amount of excitation light reaching the underlying semiconductor layer and thus the number of photo-generated carriers across the semiconductor layer. The form or profile of each of the masking layers of each of the emitter elements contributes thereby to the generation of the plurality of unidirectional (strong or sharp) gradients in a direction parallel to the semiconductor surface. Furthermore, the form or profile of each of the masking layers contributes to the suppression of the generation of gradients, which have substantially opposite directions and which lead to destructive superposition of the generated terahertz radiation.

The masking layer of each of the emitter elements may exhibit one steep edge on one of its sides, said steep edge having a height in a direction normal to the first major surface of the semiconductor layer which is substantially equal to the maximal thickness of the masking layer. The thickness of the masking layer is successively or gradually reduced towards the opposite side of the masking layer.

The term steep edge may be understood as an edge or edge surface characterized by a step-like or step-wise increase of the thickness of the masking layer. In particular the steep edge or steep edge surface may form an angle close to 90° with the first major surface (incident surface) of the semiconductor layer, in particular an angle in the range of 75° to 115°, more particularly in the range of 85° to 105°. In other words, the masking layer is configured such that its thickness exhibits a step-like increase from zero to a maximal thickness on one of the sides of the semiconductor layer. On the opposite side, the thickness is varied gradually.

In one example an intersection of the masking layer of each of the emitter elements with a plane substantially normal to the first major surface of the semiconductor layer exhibits a geometric form which may be approximated to a substantially right-angle triangle or to a trapezoid having one right-angle. One of the surfaces of the right triangle is substantially parallel and adjacent to the first major surface of the semiconductor layer. A second surface (i.e. the steep edge or edge surface) of the triangle or trapezoid forms an angle substantially equal to 90° with the first major surface of the semiconductor layer.

According to an aspect, the emitter may comprise a plurality of emitter elements being separated from each other, such that the diffusion of the charge carriers between two adjacent emitter elements is substantially prevented. In case the plurality of the emitter elements share a common semiconductor layer, the individual emitter elements may be separated from each other by means of grooves or channels or cuts formed in the semiconductor layer.

By separating the individual emitter elements from each other so as to prevent the diffusion of the charge carriers between two adjacent emitter elements, a unidirectivity of generated (strong or sharp) gradients of the charge carrier densities in each emitter element may be assured. In particular, by preventing the diffusion of charge carriers between two neighboring emitter elements, the generation of a second gradient in the area of transition between two different emitter elements (e.g. between a second area of a first emitter element and a first area of a second emitter element) may be efficiently prevented. The second gradient generated in the area of transition between two different emitter elements is generally directed in a direction substantially opposite to the gradient generated at the area of transition between the first and the second area of a single emitter element. The second gradient contributes thus to a destructive superposition of the generated terahertz radiation.

According to an aspect, the generation of the gradient of the charge carrier density in the first and the second areas of each emitter element may be realized by modifying or structuring the semiconductor layer itself, rather than by a provision of an additional masking layer.

Thus for example, in the second area the semiconductor layer may be configured or modified so as to be substantially non-absorbent for the excitation light. In the first area, the (non-modified) semiconductor may be absorbent of the excitation light. Alternatively, in the second area the semiconductor layer may be configured or modified such that the mobility of the charge carriers is substantially lower than the mobility of the charge carriers in the first (non-modified) area. As explained above, a (strong or sharp) gradient of the charge carrier density distribution is generated in the area of transition from a non-modified area to an adjacent modified area.

The modification of the semiconductor layer may comprise ion implantation, which is conducted such that in the modified areas the semiconductor is substantially non-absorbent for the excitation light, or the mobility of the charge carriers in the modified areas is substantially lower than the mobility of the charge carriers in the non-modified areas.

When a plurality of (strong or sharp) charge carrier density gradients are generated, it is advantageous if they are unidirectional. Unidirectivity may be achieved by a suitable structuring of the semiconductor layer. Unidirectivity may be achieved by separating the individual emitter elements, so that the diffusion of charge carriers between the neighboring emitter elements is substantially prevented.

The unidirectivity of the generated gradients may also be achieved by controlling the absorption profile or the profile of the mobility modification, in a manner similar to the one described in connection with the examples, wherein the form and/or the thickness of the masking layer is varied.

Thus, for example, if the absorption coefficient in a modified area of the semiconductor layer is plotted in a predetermined direction parallel to the first semiconductor surface, a cross-sectional profile of each modified area may be obtained. This cross-sectional profile may exhibit a sharp or abrupt rise in the absorption coefficient on one side and a gradual fall, for example a slow, relatively gentle fall, towards the other side. In other words, the modified area may be configured so as to exhibit an abrupt, step-like or sharp change, in the absorption coefficient on only one of its sides. This gives rise to a single strong or sharp gradient in the excitation profile, and respectively to a single (strong or sharp) gradient of the charge carrier density in the area of the abrupt transition between the non-modified area to the modified area. On the other side of the modified area, where there is a relatively gentle, gradual transition in the absorption coefficient, substantially no gradient in the charge carrier density is generated. Similarly, the modification of the mobilities of the charge carrier may exhibit an appropriate asymmetric profile, with a sharp or abrupt, step-like change on one side only. By structuring the semiconductor layer by periodic repetition of the modified area with a profile described above, a semiconductor layer with a plurality of unidirectional gradients may be realized.

According to an aspect, the semiconductor layer is of a semiconductor material, which is selected such that
  the mobilities of the (photo-generated) charge carriers are high; and/or
  the difference in the mobilities of the (photo-generated) charge carriers (electrons and holes) is as high as possible. In an ideal case, one type of charge carrier is, for example, rapidly trapped on the corresponding point defects, so that its mobility tends towards zero.

The semiconductor material may be suitably modified, for example via ion implantation and/or by subjecting it to special growth conditions (as for example in low temperature grown gallium arsenide GaAs), in order to change, in particular increase the mobility of the charge carriers and/or to selectively or purposefully introduce defects (in particular point defects such as vacancies, substitutional defects, impurities or other defects of the semiconductor lattice) for a given type of charge carrier.

The semiconductor layer may be of or composed of a direct semiconductor material.

The semiconductor material of the semiconductor layer may be selected from the group of binary, ternary, or quaternary compound semiconductors of the third and fifth group of the period table of elements, for example GaAs, InAs, InSb, GaSb, InGaAs, InP, GaN, GaAsN, GaInAsN, grown at a regular or at a low growth temperature.

In an aspect, the thickness of the semiconductor layer is no less than the absorption length of the semiconductor material for the given wavelength of the excitation light. For example, the thickness of the semiconductor layer may be selected so as to be no greater than 10 µm, optionally no greater than 5 µm, further optionally no greater than 1 µm and no less than 500 nm.

According to another aspect there is provided a method of generating terahertz radiation having frequency in the range of 10 GHz to 50 THz, optionally in the range of 100 GHz to 10 THz. The method comprises:
  providing a passive terahertz radiation source according to one of the above described aspects;
  illuminating the first major surface of the semiconductor layer of the at least one emitter element of the passive terahertz radiation source with a pulsed excitation light, generating thereby terahertz radiation;
  wherein said terahertz radiation is generated without an application of an external voltage to the passive terahertz radiation source.

The excitation light may be incident on the first major surface of the semiconductor layer in a direction substantially normal to the first major surface. The terahertz radiation may be generated in a direction substantially along or substantially opposite the direction of propagation of the excitation light. In other words, the terahertz radiation may be generated in a direction substantially normal to the first major surface of the semiconductor layer of each emitter element.

One advantage of the passive terahertz radiation source and the method for generation of terahertz radiation employing the passive terahertz radiation source may be that saturation effects due to field shielding or screening do not occur, even when the excitation light has a high intensity. On the contrary, the gradient in the excitation profile is increased with the increase of the intensity of the excitation light. This leads, for example, to a shift of the central frequency of the broad band spectrum towards higher frequencies.

A further advantage may be the facilitation of the outcoupling of the emitted terahertz light. Still another advantage may be the simplicity of use and manufacture of the passive terahertz radiation source.

The passive terahertz radiation source and the method to generate terahertz radiation by means of a passive terahertz radiation source may have various applications. Examples include terahertz spectroscopy and imaging, industrial quality and process control, security control, material analysis, package inspection, chemical analysis, contamination measurements, remote sensing, environmental sensing, information and communication technology, etc.

The passive terahertz radiation source and the method to generate radiation by means of the a passive terahertz radiation source may especially have applications, which are not covered by terahertz radiation sources relying on applied voltage. Examples of such applications are a generation of terahertz radiation in vacuum, in liquid or fluidic environments (for example micro-fluidic sensor applications) or in hostile environments, which are not suitable for connecting the terahertz emitter with electrical contacts.

These and other objects, features and advantages of the present invention will become more apparent upon reading of the following detailed description of preferred embodiments and accompanying drawings. Other features and advantages of the subject-matter described herein will be apparent from the description and the drawings and from the claims. It should be understood that even though embodiments are separately described, single features thereof may be combined to form additional embodiments.

These and other aspects will now be described in detail with reference to the following drawings.

The same reference signs are used throughout the figures for the same or similar elements and/or features.

Figure 1:
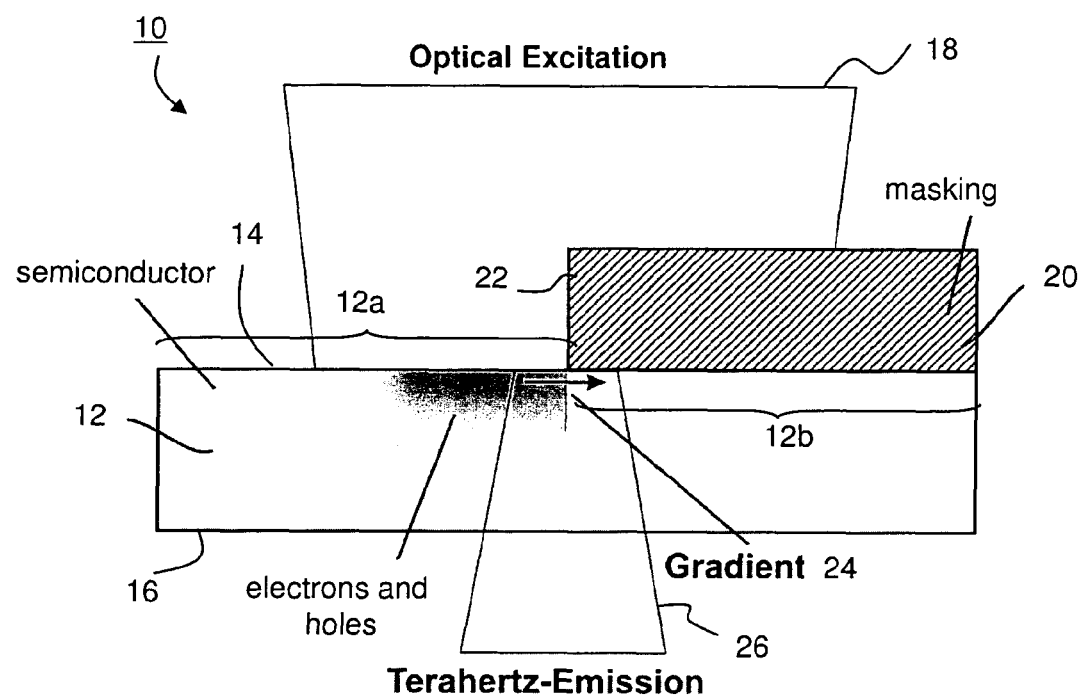
FIG. 1 shows schematically the excitation and emission principle of a simple passive terahertz radiation source.

FIG. 1 shows a cross-sectional view of an emitter having one emitter element 10 of a simple passive terahertz radiation source. FIG. 1 illustrates the basic principle of excitation and emission of terahertz radiation in a passive terahertz radiation source. The cross-sectional view is a view in a plane substantially normal to the first major (incident) surface of the semiconductor layer of the emitter element).

The emitter element 10 comprises a semiconductor layer 12, in particular a photoconductive semiconductor layer (short photoconductive layer). The semiconductor layer 12 has two major surfaces 14 and 16. The term "major surface" may be understood to refer to a surface of the semiconductor layer having a surface area which is substantially greater than the surface area of another surface (for example a side surface) of the semiconductor layer.

In the example shown in FIG. 1 the major surfaces 14 and 16 are substantially planar and substantially parallel to each other. At least one of the major surfaces of the semiconductor layer 12 (for example the surface 16 opposite to the incident surface 14) may, however, deviate from the planar form and may be for example a convex or concave spherical or aspherical surface. Furthermore, the major surfaces 14 and 16 may not be substantially parallel to each other. The semiconductor layer 12 may be mounted or deposited on a suitable substrate or a substrate structure (not shown in FIG. 1).

One of the major surfaces 14 of the semiconductor layer 12 is arranged so that at least a portion of it is exposed to a pulsed excitation light 18. The surface 14 will be also referred to as the incident surface. The pulsed excitation light 18 may be incident on the incident surface 14 of the semiconductor layer 12 in a direction substantially normal to the incident surface 14. The excitation light 18 may have a wavelength in the near infrared. The duration of a single pulse may be in the femtosecond range (fs) to picosecond (ps) range. The average intensity of the pulsed excitation light may be about few tens of milliwatt (mW) to several watt (W).

The semiconductor layer 12 comprises a first area 12a and a second area 12b. A masking layer 20 is applied or deposited on the incident surface 14 so as to cover the second area 12b of the semiconductor layer. The first area 12a of the semiconductor layer is not covered by the masking layer 20.

In an alternative example, at least a portion of the first area 12a of the semiconductor layer may also be covered by the masking layer 20. The thickness of the masking layer 20 covering the first area 12a may be such that upon illumination with excitation light the number of charge carriers (electrons and holes) generated in the first area 12a is considerably greater than the number of charge carriers generated in the second area 12b of the semiconductor layer 12. Thus, the thickness of the masking layer 20 covering the first area 12a may be substantially smaller than the thickness of the masking layer 20 covering the second area 12b, so that a sufficient amount of the excitation light may reach the first area 12 of the semiconductor layer, generating thereby photo-excited charge carriers.

The masking layer 20 may be of a material which is opaque for the excitation light, in particular of a material which is opaque for optical light in the near infrared. Suitable materials are various metals, such as gold. In the example shown in FIG. 1 the masking layer 20 has a substantially uniform thickness.

On one side of the masking layer, where a transition between the first area 12a of the semiconductor layer 12 and the second area 12b occurs, the masking layer exhibits a sharp edge or sharp edge surface 22. The sharp edge or edge surface 22 may be formed due to a step-like or step-wise increase in the thickness of the masking layer 12. The slope of this edge or edge surface 22 should preferably be as steep as possible. Thus, for example, the edge or edge surface 22 of the masking layer 20 may be arranged substantially normal to the incident surface 14 of the (photoconductive) semiconductor layer, or may be arranged at an angle close to 90° with respect to the incident surface 14 of the semiconductor layer.

When excitation light is incident on the incident surface 14 of the semiconductor layer 12, charge carriers (electrons and holes, respectively electron-hole pairs) are generated in the (portion of the) first area 12a of the semiconductor layer 12 which is exposed to the excitation light. The area in which charge carriers are generated upon illumination with excitation light is schematically shown as shaded area in FIG. 1.

The sharp edge or edge surface 22 of the masking layer 20 introduces a strong or sharp gradient in the excitation profile in the area of the edge 22 of the masking layer, i.e. in the area of transition between the first semiconductor area 12a and the second semiconductor area 12b. This leads to a non-uniform (i.e. anisotropical) distribution of the charge carriers in a direction substantially parallel to the semiconductor surface and to a gradient 24 of the charge carrier density in a direction substantially parallel to the semiconductor surface 14. The (strong or sharp) gradient is generally directed in a direction starting from the first area 12a in which initially photo-generated charge carriers are present (i.e. from the exposed area of the incident surface which for example is substantially free from masking material or which may be covered by a (very) thin layer of masking material) and pointing towards the second area 12b, which is initially substantially free from photo-generated charge carriers (i.e. towards the area of the semiconductor layer covered by the masking layer). In FIG. 1 (and in the remaining figures) the (strong or sharp) gradient 24 of the charge carrier density is schematically represented as an arrow pointing in the direction in which the density of the charge carriers changes (in the direction of the gradient).

The anisotropy in the distribution of the electrons and holes is in turn responsible for the spatial separation of the electrons and holes via diffusion parallel to the incident surface 14 of the semiconductor layer 12. The spatial separation leads to an emission of a pulsed terahertz radiation 26 by a photo-Dember effect. The direction of propagation of the emitted or generated terahertz light is substantially normal to the incident surface 14 of the semiconductor layer 12. The direction of propagation of the emitted terahertz light may be substantially along or opposite the direction of propagation of the pulsed excitation light 18. The average duration of the generated terahertz pulses is from about a femtosecond (fs) to about hundred (or several hundreds of) picoseconds (ps), in particular from about a few tens of femtoseconds to about several picoseconds, with an average repetition range given by the repetition rate of the laser used for excitation of the emitter. The average power level of the generated terahertz radiation is in the picowatt (pW) to milliwatt (mW) range, depending on the size of the emitter and the average excitation power.

In order to increase the proportion of the excitation light, which is utilized for generation of terahertz radiation, the passive terahertz radiation source may comprise a plurality of emitter elements, which are configured so as to be simultaneously illuminated by the pulsed excitation light. In an example, the plurality of emitter elements may be arranged in a periodical pattern. The emitter comprising a plurality of emitter elements may be configured or structured so as to realize a periodical repetition of an anisotropy in the distribution of electrons and holes, which is expressed in particular in the periodic repetition of an unidirectional gradient of the charge carrier density in a direction parallel to the semiconductor surface.

The plurality of emitter elements may share a common semiconductor layer. The plurality of masking layers of each of the emitter elements may constitute a structured masking layer being applied to the incident surface of the common semiconductor layer.

Figure 2:
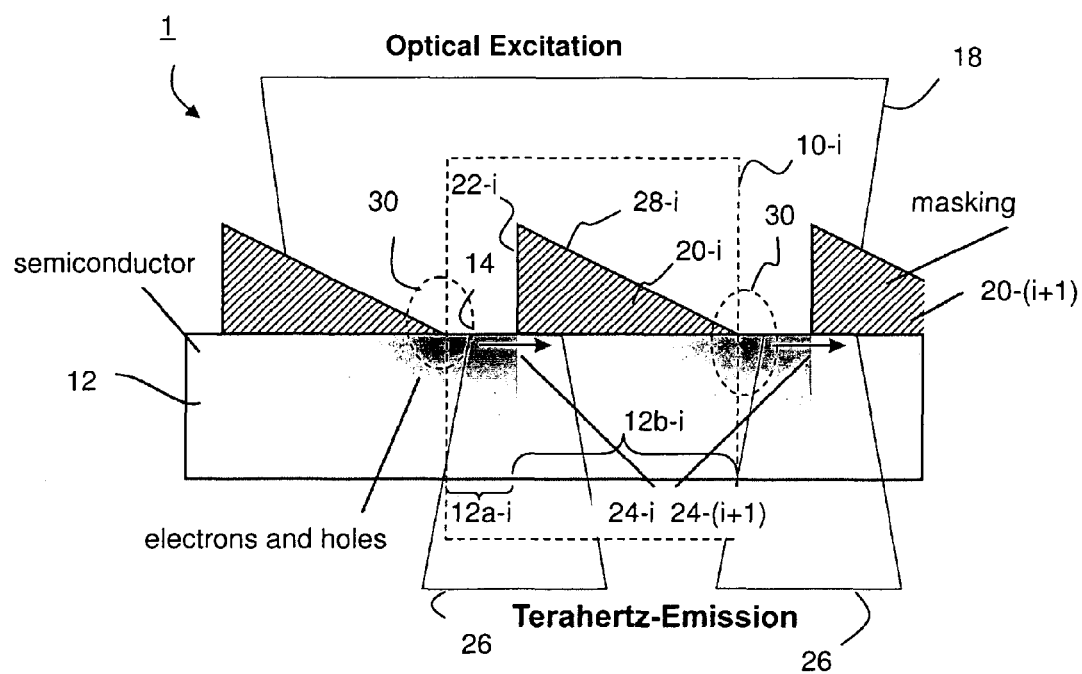
FIG. 2 shows schematically the excitation and emission principle of a passive terahertz radiation source comprising a plurality of emitter elements.

A schematic representation of one example of a passive terahertz radiation source comprising an emitter 1 having multiple emitter elements 10-i, i=1, 2, 3, . . . is shown in FIG. 2. FIG. 2 shows a cross-sectional view of a portion of the emitter.

The emitter 1 comprises a plurality of emitter elements 10-i, i=1, 2, 3, . . . which all share a single, continuous semiconductor layer 12, in particular a photoconductive semiconductor layer (short photoconductive layer). The semiconductor layers of each the emitter elements 10-i, i=1, 2, 3, . . . correspond thus to areas of the single, continuous semiconductor layer 12. The semiconductor layer 12 has a first major (incident) surface 14.

Each emitter element 10-i is provided with a corresponding masking layer 20-i applied on or deposited on the incident surface 14 of the semiconductor layer. The construction of each of the plurality of masking elements 20-i is substantially the same. The plurality of emitter elements 10-i, i=1, 2, 3, . . . are arranged in a periodic pattern. The plurality of masking layers 20-i corresponding to the emitter elements 10-i thus constitute a structured masking layer, which is applied or deposited on the incident surface 14 of the semiconductor layer 12.

As explained in connection with the example shown in FIG. 1, each emitter element 10-i comprises a first area 12a-i and a second area 12b-i, wherein the masking layer of each emitter element is applied or deposited on the incident surface 14 of the semiconductor layer 12, so as to cover the second area 12b-i of the semiconductor layer. The first area 12a-i of the semiconductor layer of each emitter element is not covered by the corresponding masking layer 20-i. As explained in connection with FIG. 1, in an alternative example, at least a portion of the first area 12a of the semiconductor layer may also be covered by the masking layer 20. The thickness of the masking layer 20 covering the first area 12a may be such that the number of photo-generated charge carries in the first area 12a of the semiconductor layer 12 upon illumination with excitation light considerably exceeds the number of charge carriers in the second area 12b of the semiconductor layer 12.

The distance between the emitter elements, between the masking layers of the emitter elements (i.e. between the areas of the semiconductor layer covered by masking layer), the area covered by the masking layers of each emitter element and the maximal thickness of the masking layers of each emitter elements may be suitably selected depending in particular on the wavelength of the excitation light and/or the material of the semiconductor layer and/or the material of the masking layer, as will be explained in more detail below.

The cross-sectional profile of the masking layers 20-i may vary. For example the cross-sectional profile of the masking layer 20-i of each emitter element 10-i may exhibit one sharp edge or edge surface 22-i on one of its sides and a relatively gentle slope or sloped surface 28-i on the other side. The thickness of the masking layer 20-i increases step-like to reach maximal thickness at the edge or edge surface 22-i of the masking layer 20-i. The thickness of the masking layer 20-i may be gradually reduced to substantially zero (or to a minimal thickness) towards the other side of the masking layer, forming thereby said (relatively gentle) slope or sloped surface 28-i. The cross-sectional profile or shape of the masking layer 20-i may be thus approximated to a substantially right-angle triangle (i.e. a triangle in which one of the internal angles is equal to about 90°), with one surface being substantially parallel to and adjacent to the incident surface 14 of the semiconductor layer 12. A second surface of each of the masking layers 20-i may be substantially normal to the incident surface 14 of the semiconductor layer 12, or arranged at an angle close to 90° with respect to the incident surface 14, forming thereby a (sharp) edge or edge surface 22-i. The third surface may be inclined at an angle of about 0.1° to about 10° with respect to the semiconductor surface 14, forming thereby a relatively gently sloped surface 28-i. In this way, masking layers with variable thickness may be realized.

By means of the variable thickness of the masking layer 20-i of each emitter element 10-i it is possible to vary the intensity of the excitation light in the semiconductor layer 12. This variation contributes to the anisotropic, unidirectional distribution of the charge carriers in the semiconductor layer 12 in a direction parallel to the incident surface 14 of the semiconductor layer 12, as it will be explained in more detail below.

In particular, the charge carrier density in the semiconductor layer 12 in the areas of each sharp edge 22-i of the respective masking layer 20-1, which is illuminated by excitation light 18, exhibits a (strong or sharp) gradient 24-i in a direction parallel to the incident surface 14. The (strong or sharp) gradient 24 generated at the illuminated edge 22-i of each of the masking elements 20-i is successively reduced or decreased with a smaller gradient in a direction towards the sharp edge of the next masking element.

At the area of transition between two neighboring emitter elements (i.e. on the side of each masking layer 20-i opposite to the respective sharp edge 22-i) the thickness is gradually varied, which results in a gradual variation of the charge carrier density. This prevents the formation of a second gradient in the corresponding areas of transition 30 between two neighboring emitter elements. The second gradient has a direction opposite to the direction of the gradient generated at the illuminated sharp edge 22-i of the respective masking layer 20-i and contributes to the destructive superposition of the generated terahertz radiation 26.

In this way, the periodically repeated (strong or sharp) gradients 24-i, i=1, 2, . . . in the distribution of the charge carrier density in the (photoconductive) semiconductor layer 12 are substantially unidirectional. This enables the constructive superposition of the terahertz radiation generated at each (strong or sharp) gradient. If the multiple gradients of charge carrier density were not unidirectional, the diffusion from gradient to gradient would have been in the opposite direction, leading to a destructive interference of the terahertz radiation.

The specific profile of the masking layers may vary, as long as it assures the generation of multiple unidirectional gradients of the charge carrier density in a direction parallel to the incident semiconductor surface.

Figure 3:
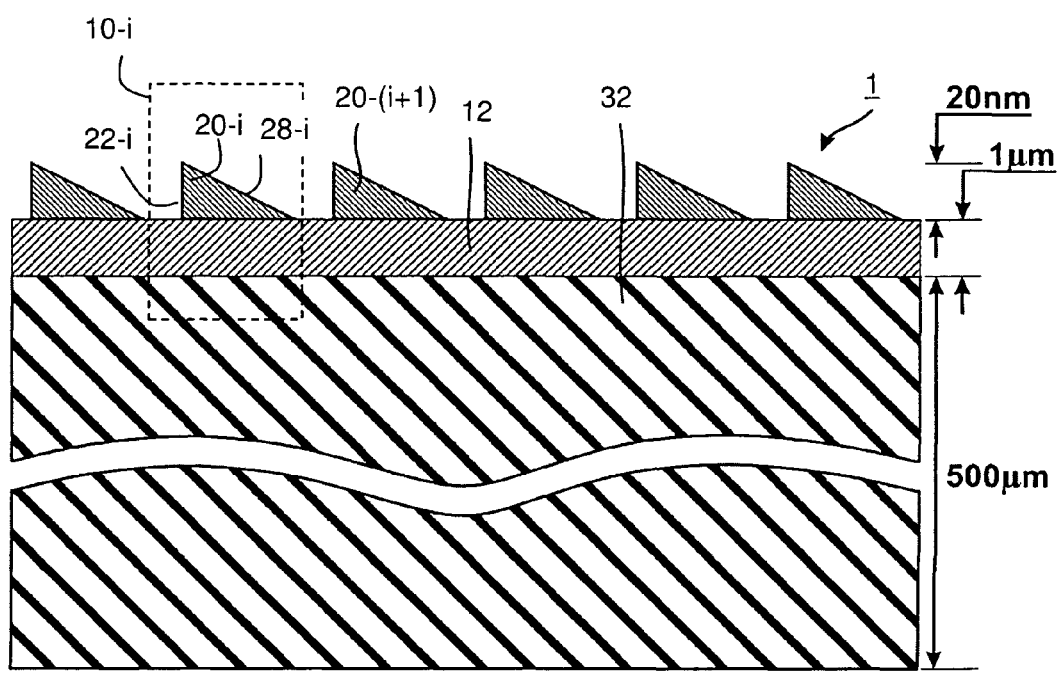
FIG. 3 shows a cross-sectional view of an example of a passive terahertz radiation source with periodically repeated gradients.
Figure 4:
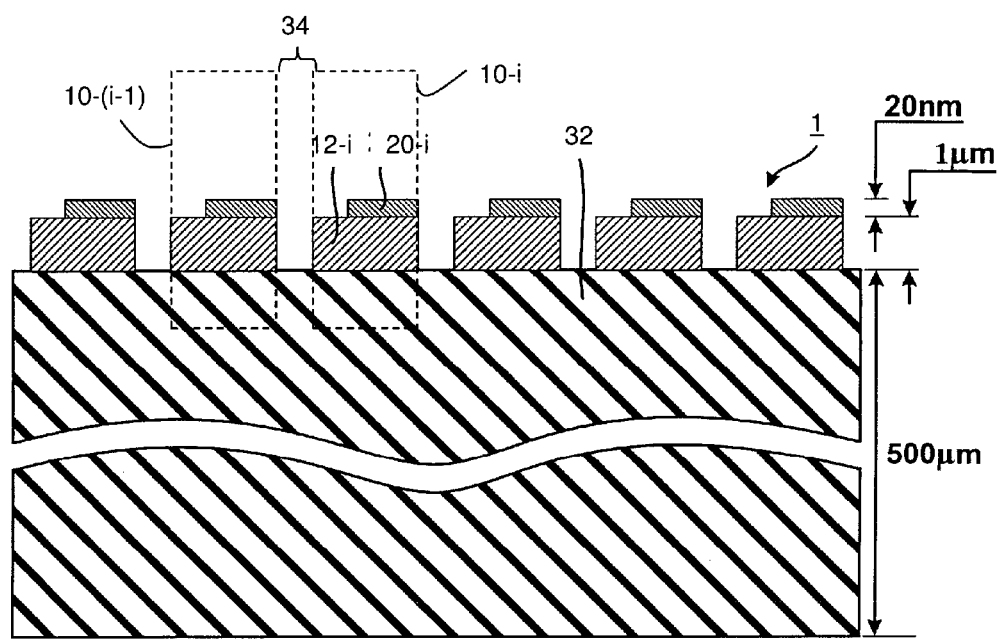
FIG. 4 shows a cross-sectional view of another example of a passive terahertz radiation source with periodically repeated gradients.
Figure 5:
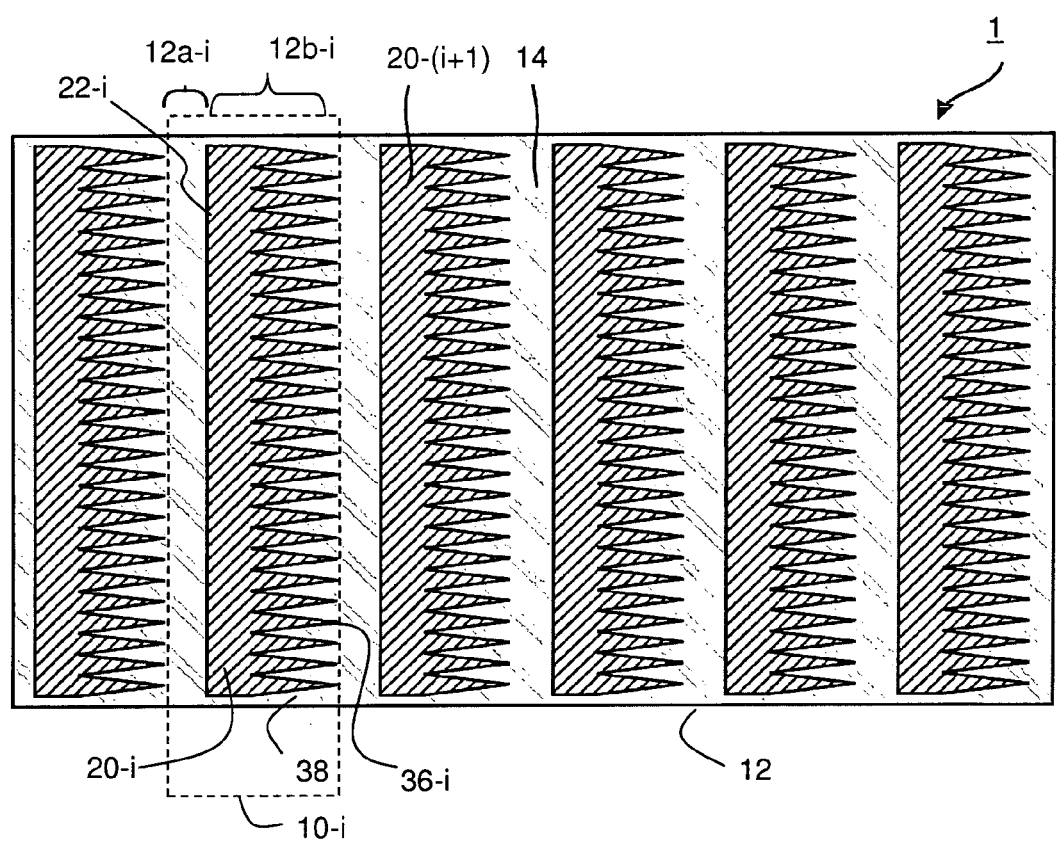
FIG. 5 shows a view from above of yet another example of a passive terahertz radiation source with periodically repeated gradients.

Further examples of passive terahertz radiation sources comprising a plurality of emitter elements, in which a periodic repetition of a unidirectional gradient of the charge carrier density in a direction parallel to the incident semiconductor surface is realized, are shown schematically in FIGS. 3 to 5.

FIG. 3 shows a cross sectional schematic view of an emitter of a passive terahertz radiation source with periodically repeated unidirectional gradients of the charge carrier density in a direction parallel to the incident surface of the semiconductor layer.

The terahertz radiation source comprises an emitter 1 having a plurality of emitter elements 10-i, i=1, . . . sharing a common, continuous semiconductor layer 12 (in particular a photoconductive semiconductor layer 12) having a substantially uniform thickness, as in the example shown in FIG. 2. The semiconductor layer 12 is deposited on a substrate 32. Each emitter element comprises a masking layer 20-i. The plurality of masking layers 20-i, i=1, . . . of each of the emitter elements 10-i constitutes a structured masking layer 20 applied to the incident surface of the semiconductor layer 20.

The structure of each of the emitter elements 10-i, as well as the arrangement of the plurality of the emitter elements 10-i and the corresponding masking layers 20-i, may substantially correspond to that of the emitter elements discussed on connection with the example shown in FIG. 2.

In the example shown in FIG. 3 the maximal thickness of the masking layer 20-i of each emitter element is 20 nm, the thickness of the semiconductor layer 12 is 1 μm and the thickness of the substrate 30 is 500 μm.

As explained in connection with FIG. 2, the variable thickness of the masking layer 20-i of each of the emitter elements 10-i (the masking layer having a cross-sectional profile with one sharp edge or edge surface 22-i and one (gently) sloped surface 28-i) leads to a repeated unidirectional gradient of the charge carrier density in the semiconductor layer 12 in a direction parallel to the incident surface 14 of the semiconductor layer 12. More specifically, the anisotropical distribution of the optically excited charge carriers results from the variation in the thickness of the masking layer 20-i, wherein the intensity of the near infrared radiation in the semiconductor layer 12 depends on the variable thickness of the masking layer 20-i. In this way, a sharp or steep or strong gradient of the charge carrier density occurs at the sharp edge 22-i of each of the masking elements 10-i. The generated gradient is successively reduced till the sharp edge of the next masking element and is repeated unidirectionally.

FIG. 4 schematically shows a cross-sectional view of another example of a passive terahertz radiation source, comprising an emitter 1 having a plurality of emitter elements 10-i, wherein the plurality of emitter elements are configured so as to generate multiple, periodically repeated unidirectional gradients.

The emitter 1 comprises a plurality of emitter elements 10-i arranged on a common substrate 32. In the example shown in FIG. 4 the thickness of the substrate is 500 μm. All emitter elements have substantially the same structure.

Each emitter element 10-i comprises a semiconductor layer 12-i (in particular a photoconductive semiconductor layer 12-i) and a respective masking layer 20-i applied to or deposited on a portion of the incident surface of the semiconductor layer 12-i. The thickness of the semiconductor layer 12-i and the thickness of the masking layer 20-i are substantially uniform or constant. The thickness of the semiconductor layer in the example shown in FIG. 4 is 1 μm and the thickness of the masking layer is 20 nm. The structure of each of the emitter elements 10-i may substantially correspond to the structure of the emitter element(s) 10 discussed in connection with the example shown in FIG. 1.

The emitter elements 10-i are arranged so as to form a repeated periodical pattern, wherein the emitter elements 10-i, i=1, 2, 3 . . . are separated from each other by separation areas 34, such that the diffusion of charge carriers from one emitter element to a neighboring emitter element is substantially prevented. The separation areas 34 may be substantially free from a semiconductor material. The width of each separation area 34, or the distance between two neighboring emitter elements, may be as small as technically realizable, as long as there is a clear separation of the individual emitter elements. The width of each separation area 34 may be about 100 nm.

The emitter elements may be initially formed to share a common semiconductor layer and be subsequently separated from each other by means of cuts, grooves or channels formed in the semiconductor layer.

The anisotropical distribution of the optically excited charge carriers in this example is one side due to the presence of separation areas 34 (for example grooves, cuts or channels formed in the semiconductor layer), which prevent the diffusion of the charge carriers in the direction of the respective separation area 34 (i.e. in the direction of the respective groove, cut or channel). On the other side, the anisotropical distribution of the optically excited charge carriers in the semiconductor layer is due to the sharp edges 22-i of the masking layers 20-i of each of the emitter elements 10-i, which causes a sharp or steep gradient of the charge carrier density.

Another example of a passive terahertz radiation source with repeated unidirectional gradients is shown schematically in FIG. 5. FIG. 5 shows a view from above of the passive terahertz radiation source according to this example.

The passive terahertz radiation source comprises an emitter 1 having a plurality of emitter elements 10-i, i=1, 2, 3, . . . . All emitter elements 10-i share a common, substantially continuous semiconductor layer 12 having a substantially uniform thickness. The semiconductor layer may be deposited on a suitable substrate (not shown in FIG. 5).

Each emitter element 10-i is provided with a masking layer 20-i applied or deposited on the incident surface 14 of the semiconductor layer 12. The masking layer 20-i of each emitter element has a substantially uniform thickness. All emitter elements 10-i. i=1, 2, . . . have substantially the same construction and are arranged in a periodic pattern.

The masking layer 20-i of each emitter element 10-i is structured so that an intersection of the masking layer 20-i with a plane substantially parallel to the incident surface 14 of the semiconductor layer 12 has a comb-like form, with one substantially straight, sharp edge or edge surface 22-i on one of its sides. The sharp edge or edge surface 22-i may extend across the surface of the semiconductor layer. The construction of the sharp edge 22 has been explained in detail in connection with FIGS. 1 to 4.

On the side opposite the sharp edge 22, the intersection of the masking layer 20-i with a plane substantially parallel to the incident surface 14 of the semiconductor layer exhibits a structured, ridged, surface 36-i, which successively covers ever smaller portions of the incident surface of semiconductor layer. The surface 36-i comprises a plurality of substantially triangular teeth 38. The tooth width and/or the distance between two neighboring teeth may be selected depending on the wavelength of the excitation light. It is advantageous if the spatial elongation, or extension of the teeth of each of the comb-like masking layers is no greater than the wavelength of the excitation light. Thus for example, for the comb-like structure shown in FIG. 6 and for excitation light having wavelength of 800 nm, the width of each of the comb teeth and the distance between the individual comb teeth may be selected to be less than 800 nm.

If the extension or elongation of the teeth of each of the comb-like masking layers is smaller than the wavelength of the excitation light, the profile of the distribution of the photo-generated charge carriers no longer corresponds to the profile of the masking, due to the diffraction. By varying the width of the comb teeth and/or the distances between the comb teeth, it is possible to vary the charge carrier density in accordance with the ratio of the masked and non-masked (exposed) surface.

The above described comb-like form of the structured masking layer of this example leads to an anisotropical distribution of the charge carrier density in the semiconductor layer in a direction parallel to the incident surface of the semiconductor layer.

The semiconductor layer 12, 12-i of the emitter elements shown in FIGS. 1 to 5 may be of or composed of various semiconductor materials. To this extent, direct semiconductors are more advantageous. In particular, the semiconductor layer 12 may be of a semiconductor material exhibiting high mobility of the charge carriers and/or of a semiconductor material exhibiting great differences in the mobility of the charge carriers. Examples of suitable semiconductor materials are GaAs, InAs, InSb, GaSb, InGaAs, InP, GaN, GaAsN, GaInAsN. The semiconductor material may be suitably modified, for example via ion implantation and/or by subjecting the semiconductor material to special growth conditions (as for example in low temperature grown GaAs), in order to increase the mobility of the charge carriers and/or to selectively or purposefully introduce defects (in particular, point defects such as vacancies, substitutional defects, or other defects of the semiconductor lattice) for a given type of charge carrier.

The thickness of the (photoconductive) semiconductor layer 12, 12-i may be selected to be no more than 10 µm, or no more than 5 µm or no more than 1 µm and/or no less than 500 nm. The thickness of the (photoconductive) semiconductor layer may be selected depending on the employed semiconductor material and the wavelength of the used excitation light. Advantageously, the thickness of the semiconductor layer may be selected to at least correspond to or be at least equal to the absorption length of the excitation light for the used semiconductor material. For example, for a near-infrared excitation light having wavelength of 800 nm and GaAs as semiconductor material, the thickness of the semiconductor layer should be at least 1 µm.

The thickness of the masking layer 20, 20-i may be suitably selected depending on the wavelength of the excitation light and the material of the masking layer. It is advantageous if the thickness of the masking layer covering at least a portion of the second area of the semiconductor layer is selected to at least correspond to or be at least equal to the absorption length of the masking material for the known wavelength of the excitation light. For example, if the masking material is gold and the excitation light is a near-infrared light, the thickness of the masking layer should be at least 12 nm. For the examples shown in FIGS. 2 and 3 in which the thickness of the masking layer is not uniform, the maximal thickness of the masking layer may be selected to at least correspond to or be at least equal to the absorption length of the masking material for the given wavelength of the excitation light. The thickness of the masking layer corresponds in particular to the height of the masking layer in a direction normal to the incident surface of the semiconductor layer.

The width of the first area 12a-i of the semiconductor layer 12 of each emitter element 10-i may be suitably selected, in particular depending on the wavelength of the excitation light. Advantageously, the width of the first area 12a-i of the semiconductor layer 12-i is selected to at least correspond, or be at least equal, to the wavelength of the excitation light. The first area 12a-i of the semiconductor layer 12-i of each emitter element 10-i may for example correspond to the non-masked area a the corresponding emitter element 10-i, i.e. to an area which is substantially free from masking layer 20-i. In particular, the width of the first area 12a-i of the semiconductor layer 12-i of each emitter element 10-i (and consequently the width of the non-masked areas of each emitter element) may be the width measured in a direction normal to the edge, respectively edge surface 22-i of each of the masking layers 20-i.

The width of the second area 12b-i of the semiconductor layer of each emitter element 10-i may be suitably selected depending on the diffusion or the mobilities of the (photo-generated) charge carriers in the used semiconductor material. Advantageously, the width of the second area 12b-i is selected to at least correspond or be at least equal to the distance, which the photo-generated charge carriers may maximally cover through diffusion within the time period of several picoseconds. For example, for GaAs this distance is in the order of 1 µm. The second area 12b-i of the semiconductor layer 12-i of each emitter element 10-i may for example correspond to the masked area of each emitter element 10-i. In other words the width of the masked area of the semiconductor layer 12 of each emitter element 12-i may correspond to the width of the associated masking layer 20-i. In particular, the width of each of the second areas 12b-i (and consequently the width of the masked areas of each emitter element) may be the width measured in a direction normal to the edge or edge surface 22-i of the corresponding masking layer 20-i.

The width of the first area 12a-i (corresponding for example to the non-masked area) and the width of the second area 12b-i (corresponding for example to the masked area) of each of the emitter elements determine the periodicity of the masking layers of the plurality of emitter elements. The overall area of the semiconductor layer which is covered by masking material may be greater than 10 µm$^2$, or greater than 100 µm$^2$, or greater than 1 mm$^2$, or greater than 1 cm$^2$, or greater than 10 cm$^2$.

The substrate of the terahertz radiation sources shown in FIGS. 3 to 5 may be of the same semiconductor material as the (photoconductive) semiconductor layer. The substrate may be, however, of different material, which is preferably transparent for a terahertz radiation. Examples of such materials are as silicon or teflon. The thickness of the substrate may be for example about 500 µm.

In the examples described above, the masking layer is made of a material which absorbs the excitation light. It is however, also possible to employ a masking layer made of a material which is capable of reflecting the incident excitation light. In this case the masking is achieved not by absorption, but by reflection of the incident excitation light. For example, the masking layers of each of the emitter elements may be of a dielectric material, and may form a reflective Bragg-mirror for the incident excitation light.

Furthermore, in the examples described above, a separate masking layer is applied or deposited on the incident surface of a semiconductor layer, in order to achieve an anisotropical optical excitation in a direction parallel to the incident surface of the semiconductor layer resulting in one or more unidirectional gradients of the distribution of the charge carriers in a direction parallel to the incident surface of the semiconductor layer. However, it is also possible to achieve anisotropical optical excitation in a direction parallel to the incident surface of the semiconductor layer by a suitable structuring or a suitable modification of the semiconductor layer itself. In this case the masking layer may be avoided.

For example, the modification of the semiconductor material of the semiconductor layer may be achieved by ion implantations in the corresponding parts of the semiconductor layer. The ion-implantation may have an effect that the photo generated charge carriers in the modified portions exhibit a substantially reduced mobility compared to the photo generated charge carriers in the non-modified portions.

The passive terahertz radiation source may comprise a source of excitation light (not shown in the figures) capable of emitting pulsed excitation light having ultrashort pulse duration. For example, suitable sources of excitation light are femtosecond lasers emitting in the near-infrared, such as a Ti:sapphire laser operating at wavelength of about 800 nm, femtosecond erbium-doped laser operating at wavelength of about 1.5 µm or other suitable sources.

The generated terahertz radiation may be collected and optionally collimated with an appropriate optical system comprising one or more optical elements (not shown in the figures) to produce a beam of terahertz radiation. The passive terahertz radiation source may be configured so as to emit at least a major portion of the generated terahertz radiation in a direction substantially coinciding with the direction of the incident excitation light. Alternatively, the passive terahertz radiation source may be configured to emit at least a major portion of the generated terahertz radiation in a direction substantially opposite to the direction of the incident excitation light.

Figure 6:
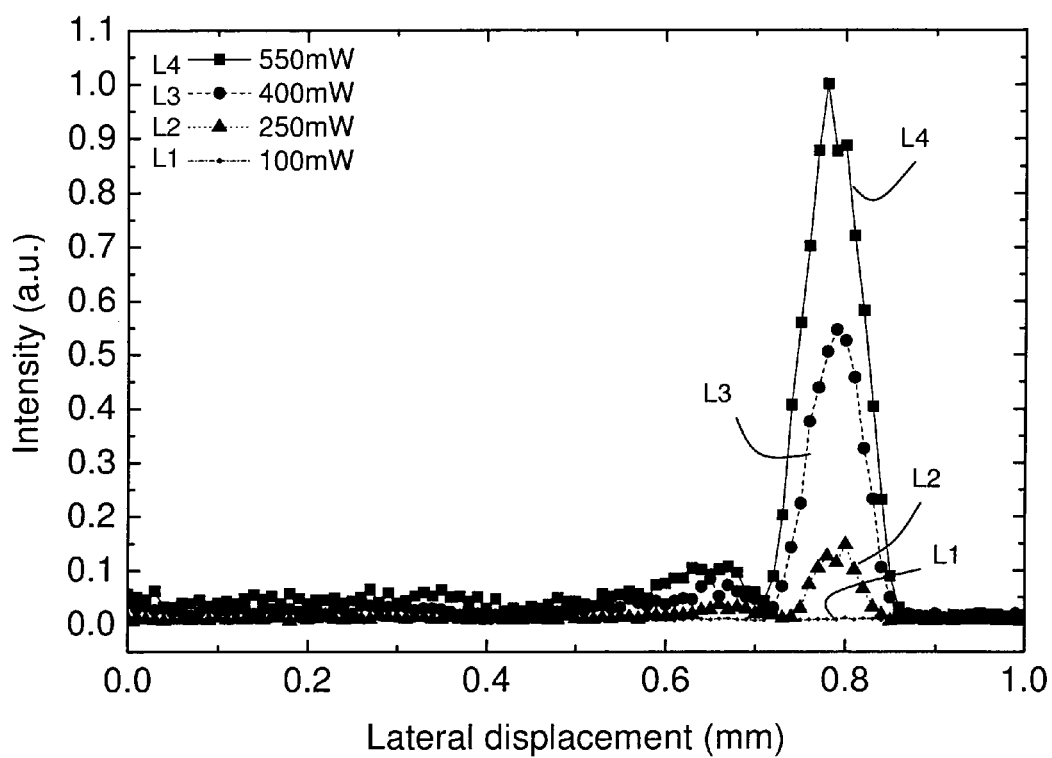
FIG. 6 shows the terahertz emission of a passive terahertz radiation source shown in FIG. 1.

FIG. 6 is a graph illustrating the experimentally measured terahertz radiation from a passive terahertz radiation source having a construction as shown in FIG. 1. Along the abscise, the lateral displacement in mm is plotted. Here lateral displacement means the displacement of the passive terahertz radiation source parallel to the incident semiconductor surface and normal to the sharp edge or edge surface against the incident laser beam. Along the ordinate, the experimentally measured normalized intensity of the generated terahertz radiation in arbitrary units is plotted.

The terahertz radiation source comprises a (photoconductive) semiconductor layer of semi-isolating GaAs. The masking layer is of metal (gold). The masking layer exhibits a single edge as shown in FIG. 1. The lateral position of the single edge is at about 0.79 mm.

The metal edge is illuminated using a train of femtosecond laser pulses. The wavelength of the excitation light is equal or shorter than the minimum wavelength required to optically excite electron-hole pairs in one of the above listed semiconductor materials.

FIG. 6 shows the terahertz emission at four different excitation intensities, by moving the excitation laser beam over the metal edge. Line L1 corresponds to an excitation intensity of 100 mW, line L2 corresponds to an excitation intensity of 250 mW, line L3 corresponds to an excitation intensity of 400 mW and line L4 corresponds to an excitation intensity of 550 mW.

When the gradient of the charge carrier density on the edge is maximal, a maximal terahertz emission is generated. The increase of the intensity of the excitation light leads to a higher terahertz emission. No saturation effects were exhibited in the tested excitation power range.

List of Reference Numerals 10 emitter
10-i emitter element
12, 12-i semiconductor layer
12a, 12a-i first area of the semiconductor layer
12b, 12b-i second area of the semiconductor layer
14 incident surface of the semiconductor layer
16 surface of the semiconductor layer opposite to the incident surface
18 excitation light
20, 20-i masking layer
22, 22-i edge, respectively edge surface of the masking layer
24, 24-i gradient of the charge carrier density in a direction parallel to the incident surface
26 generated terahertz radiation
28, 28-i sloped surface of the masking layer
30 area of transition between two emitter elements
32 substrate
34 separation areas
36 ridged surface
38 teeth

The invention claimed is:

1. A passive terahertz radiation source configured to emit electromagnetic radiation having a frequency in a range of 10 GHz to 50 THz, the passive terahertz radiation source comprising:
    a source of a pulsed excitation light;
    an emitter comprising one or more emitter elements, each emitter element comprising a semiconductor layer being arranged such that at least a portion of a first major surface of said semiconductor layer is exposed to the pulsed excitation light;
    where each emitter element is configured such that upon exposure to the pulsed excitation light, a gradient of a charge carrier density is generated in the semiconductor layer in an area of transition between a first area of the semiconductor layer and a second area of the semiconductor layer, the gradient being substantially parallel to the first major surface of the semiconductor layer, and
    where the passive terahertz radiation source is configured to emit electromagnetic radiation without using an external magnetic field.

2. The passive terahertz radiation source according to claim 1, where each emitter element is configured such that at least one of:
    a number of charge carriers in the first area and a number of charge carriers in the second area of the semiconductor layer differ substantially, generating thereby the gradient of the charge carrier density in the semiconductor layer in a direction parallel to the first major surface of the semiconductor layer; or
    a mobility of the charge carriers in the first area and a mobility of the charge carriers in the second area of the semiconductor layer differ substantially, generating thereby the gradient of the charge carrier density in the semiconductor layer in a direction parallel to the first major surface of the semiconductor layer.

3. The passive terahertz radiation source according to claim 1, where the emitter comprises a plurality of emitter elements, said plurality of emitter elements being configured such that a plurality of substantially unidirectional gradients of the charge carrier density are generated in a direction substantially parallel to the first major surface of the semiconductor layer.

4. The passive terahertz radiation source according to claim 3, where said plurality of gradients of the charge carrier density form a periodical pattern.

5. The passive terahertz radiation source according to claim 1, where each emitter element comprises a masking layer of material capable of absorbing or reflecting the pulsed excitation light, said masking layer being applied on the first major surface of the semiconductor layer, such that the first area of the semiconductor layer is substantially free from the masking layer and at least a portion of the second area of the semiconductor layer is covered by the masking layer.

6. The passive terahertz radiation source according to claim 5, where a thickness of the masking layer of each of the emitter elements is substantially uniform.

7. The passive terahertz radiation source according to claim 5, where the emitter comprises a plurality of emitter elements, and where an intersection of the masking layer of each of the plurality of emitter elements with a plane substantially parallel to the first major surface of the semiconductor layer has a substantially comb-like form, comprising one substantially straight edge on one of its sides and a plurality of substantially equidistantly spaced teeth on an opposite side.

8. The passive terahertz radiation source according to claim 5, where a thickness of the masking layer of each of the emitter elements is variable and a thickness distribution is asymmetric in a direction parallel to the first major surface of the semiconductor layer.

9. The passive terahertz radiation source according to claim 8, where the masking layer of each of the emitter elements exhibits one steep edge on one of its sides, said steep edge having a height in a direction normal to the first major surface of the semiconductor layer which is substantially equal to a maximal thickness of the masking layer, and where the thickness of the masking layer is gradually reduced towards an opposite side of the masking layer.

10. The passive terahertz radiation source according to claim 8, where an intersection of the masking layer of each of the emitter elements with a plane substantially normal to the first major surface of the semiconductor layer exhibits a geometric form which may be approximated to a substantially right-angle triangle or to a trapezoid having one right-angle.

11. The passive terahertz radiation source according to claim 1, where the emitter comprises a plurality of emitter elements being separated from each other, such that a diffusion of charge carriers between two adjacent emitter elements is substantially prevented.

12. The passive terahertz radiation source according to claim 1,
    where the second area of the semiconductor layer is configured or modified so as to be substantially non-absorbent for the pulsed excitation light; or
    where the second area of the semiconductor layer is configured or modified such that a mobility of charge carriers is substantially lower than a mobility of charge carriers in the first area.

13. The passive terahertz radiation source according to claim 1, where the semiconductor layer is of a semiconductor material selected from the following:
    GaAs, low temperature grown GaAs, InAs, InSb, GaSb, InGaAs, InP, GaN, GaAsN, and GaInAsN.

14. The passive terahertz radiation source according to claim 1, where a thickness of the semiconductor layer is no less than an absorption length of the semiconductor material for a given wavelength of the pulsed excitation light.

15. A method of generating terahertz radiation having a frequency in a range of 10 GHz to 50 THz, optionally in the range of 100 GHz to 10 THz, the method comprising:
    providing a passive terahertz radiation source that includes a source of a pulsed excitation light; an emitter comprising one or more emitter elements, where each emitter element comprises a semiconductor layer being arranged such that at least a portion of a first major surface of said semiconductor layer is exposed to the pulsed excitation light; where each emitter element is configured such that upon exposure to the pulsed excitation light, a gradient of a charge carrier density is generated in the semiconductor layer in an area of transition between a first area of the semiconductor layer and a second area of the semiconductor layer, the gradient being substantially parallel to the first major surface of the semiconductor layer; and
    illuminating the first major surface of the semiconductor layer of the at least one emitter element of the passive terahertz radiation source with the pulsed excitation light, generating thereby terahertz radiation;
    where said terahertz radiation is generated without an application of an external voltage to the passive terahertz radiation source and without using an external magnetic field.

* * * * *

UNITED STATES PATENT AND TRADEMARK OFFICE
CERTIFICATE OF CORRECTION

| | | |
|---|---|---|
| PATENT NO. | : 8,563,955 B2 | Page 1 of 1 |
| APPLICATION NO. | : 13/377485 | |
| DATED | : October 22, 2013 | |
| INVENTOR(S) | : Thomas Dekorsy et al. | |

It is certified that error appears in the above-identified patent and that said Letters Patent is hereby corrected as shown below:

On the Title Page

Inventors item (75) should read as follows:

Thomas Dekorsy, Konstanz (DE);
Gregor Klatt, Konstanz (DE);
Georg Bastian, Kleve (DE);
Klaus Huska, Pfinztal (DE)

PCT Filing Date item (22) should read as follows:

June 12, 2009

Signed and Sealed this
Eighteenth Day of February, 2014

Michelle K. Lee
*Deputy Director of the United States Patent and Trademark Office*